(12) United States Patent
Nagar et al.

(10) Patent No.: US 6,604,143 B1
(45) Date of Patent: Aug. 5, 2003

(54) SCALABLE PROXY SERVERS WITH PLUG-IN FILTERS

(75) Inventors: Vivek Nagar, Sunnyvale, CA (US); Inderjeet Singh, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/335,753

(22) Filed: Jun. 18, 1999

Related U.S. Application Data (60) Provisional application No. 60/089,995, filed on Jun. 19, 1998.

(51) Int. Cl.$^7$ .............................................. G06F 15/16
(52) U.S. Cl. ..................... 709/229; 709/227; 707/100
(58) Field of Search ................................ 709/223–226, 709/219, 227, 239, 315, 229, 302, 206, 203; 713/201; 707/100, 9

(56) References Cited

U.S. PATENT DOCUMENTS

| | | | |
|---|---|---|---|
| 5,673,322 A | | 9/1997 | Pepe et al. ..................... 380/49 |
| 5,805,820 A | | 9/1998 | Bellovin et al. |
| 5,835,726 A | | 11/1998 | Shwed et al. |
| 5,864,666 A | | 1/1999 | Shrader |
| 5,884,025 A | | 3/1999 | Baehr et al. |
| 5,884,033 A | * | 3/1999 | Duvall et al. ............... 709/206 |
| 5,951,651 A | * | 9/1999 | Lakshman et al. .......... 709/239 |
| 5,956,508 A | * | 9/1999 | Johnson et al. ............. 709/315 |
| 5,958,008 A | * | 9/1999 | Pogrebisky et al. ........ 709/223 |
| 5,958,052 A | * | 9/1999 | Bellovin et al. ............. 713/201 |
| 6,006,279 A | * | 12/1999 | Hayes ......................... 709/302 |
| 6,055,572 A | * | 4/2000 | Saksena ...................... 709/224 |
| 6,065,055 A | * | 5/2000 | Hughes et al. .............. 709/229 |
| 6,094,684 A | * | 7/2000 | Pallman ...................... 709/227 |
| 6,105,027 A | * | 8/2000 | Schneider et al. ............. 707/9 |
| 6,125,385 A | * | 9/2000 | Wies et al. .................. 709/203 |
| 6,148,336 A | * | 11/2000 | Thomas et al. ............. 709/239 |
| 6,182,141 B1 | * | 1/2001 | Blum et al. ................. 709/227 |
| 6,336,117 B1 | * | 1/2002 | Massarani ................... 707/100 |
| 6,453,335 B1 | * | 9/2002 | Kaufmann ................... 709/203 |

FOREIGN PATENT DOCUMENTS

| | | |
|---|---|---|
| EP | 0 713 311 A1 | 5/1996 |
| GB | 2 318 031 A | 4/1996 |
| JP | A-10-10994 | * 1/1998 |

OTHER PUBLICATIONS

Notification of Transmittal of International Search Report or the Declaration with attached International Search Report (3 pages), mailed Dec. 7, 1999.
Hiraiwa et al. A Social Information Filtering System for the WWW.IEEE 1996.*
Ross. Hash Routing for Collections of Shared Web Caches. IEEE 1997.*

* cited by examiner

*Primary Examiner*—Mark Powell
*Assistant Examiner*—Thong Vu
(74) *Attorney, Agent, or Firm*—Finnegan, Henderson, Farabow, Garrett & Dunner, L.L.P.

(57) ABSTRACT

A proxy server operative to accept plug-in filters to perform forward and reverse filtering between a client process and a server process. In accordance with one aspect of the invention, a method of filtering information includes the steps of receiving a request by the proxy server from a client. The proxy server identifies a Uniform Resource Locator (URL) of a server process in the request and compares that URL against filter rules previously defined to the system. In the event the URL satisfies one of the filter rules, a filter servlet associated with the satisfied filter rule is used to filter the requested information. A filter servlet is a set of instructions that, when executed, filters the information. The filtered request is then used to retrieve information from a server process. Similarly, the same filtering process may be performed on a response from the server process destined for a client process.

25 Claims, 6 Drawing Sheets

SCALABLE PROXY SERVERS WITH PLUG-IN FILTERS

RELATED APPLICATIONS

The present application claims priority from a Provisional Application, application No. 60/089,995 filed Jun. 19, 1998.

FIELD OF THE INVENTION

This invention relates to filtering information transmitted between a client and a server process and, more particularly, to using a proxy server and plug-in filters to filter information transmitted between a client process and a web server.

BACKGROUND OF THE INVENTION

The proliferation of the Internet has significantly increased the amount of information that businesses and consumers can access. Managing the influx of information is becoming increasingly important because there is some information that users wish to either not share with others on the Internet or would prefer that others not send them. By attaching a computer or a network to the Internet, users can search, access and download all types of information ranging from secure business or government information to information related to entertainment. Because of the few controls on the Internet, access to various types of information has increased drastically. There are, however, instances when users would like to filter out information retrieved from the network. For example, a business or government agency may not want security or sensitive information leaving their domain, e.g., local network. In addition, some information received from the Internet may not be operable in the format it was received. For example, the display resolution characteristics for a document received from the Internet may be different than that supported by the user receiving the document.

To address these concerns, systems have been developed to prevent some information from passing into and out of a domain. These systems filter information, but are complex and not easily tailored to a specific business. Generally, once the software developer writes a system that performs any filtering of information, what is filtered or how it is filtered cannot be modified except by having the software developer create a whole new filtering system. The problem with this approach is that many businesses and consumers have specific, and changing, needs of what and how to filter various information, and it may not be feasible to have a software developer rebuild the system every time the user desires different content to be filtered. Furthermore, there currently are no systems that allow for the modification of the data to make information, inoperative when first received, operative in the user's environment.

By using the Internet, and specifically the World Wide Web ("Web"), the ability to interface with computers is simplified. The architecture of the web follows conventional client-sever model. The term "client" and "server" are used to refer to a computer's general role as a requester of data (the client) or provider of data (the server). Under the Web environment, Web browsers reside in the client and specially formatted "Web documents" reside on Internet Web servers. Web clients and Web servers typically communicate using the protocol called "hypertext transferred protocol" (HTTP).

In operation, a browser opens the connection to the server and initiates a request for a document. The server delivers the requested document, typically in the form coded in a standard "hypertext markup language" (HTML) format. After the document is delivered, the connection is closed. The browser displays the document and performs a function designated by the documents.

Therefore it is desirable to improve the filtering of information.

SUMMARY OF THE INVENTION

Methods, systems and articles of manufacture consistent with the present invention overcome the shortcomings of existing systems for filtering information between a client process and a server process by providing a proxy server with plug-in filters. The proxy server with plug-in filters allows for easy modification of what information to filter and how to filter it. In addition, the use of plug-in filters allow for the modification of information beyond removing content of the information, but also modifying the characteristics of the information to correspond with the client or server processes environments.

In accordance with one aspect of the present invention, as embodied and broadly described herein, a method of filtering information from a first process to a second process, comprises the steps of receiving the information from the first process, selecting a filter to apply to the information received by the first process, applying the filter to the information by modifying the information based on instructions contained in the filter, and transmitting the modified information to the second process. The first process may be a client process, the information a request and the second process a server process. The information contained in the request may be security information. Alternatively, the first process may be a server process, the second process a client process, the information is a response and the modified information is a modified response. In addition, the filtered response may be cached. The step of selecting a filter to apply to the information may comprise the steps of defining a Uniform Resource Locator (URL) and an associated filter, retrieving a URL from the information, and in the event the defined URL matches the retrieved URL, selecting the filter associated with the defined URL to apply to the information.

In accordance with yet another aspect of the invention, as embodied and broadly described herein, a method of filtering information using a proxy server comprises the steps of receiving a request from a client process, applying a forward filter to the request, transmitting the filtered request to a server process, receiving a response from the server process related to the filtered request, applying a reverse filter to the response, and transmitting the filtered response to the client. The second process may be a Web server, in which case the step of applying the forward filter may comprise the steps of defining a URL and an associated filter, and filtering the request using the associated filter in the event the defined URL is contained in the request. Also when the second process is a Web server, the step of applying the reverse filter may comprise the steps of defining a URL and an associated filter, and filtering the request using the associated filter in the event the defined URL is contained in the response. The filtered response may be cached.

In accordance with yet another aspect of the invention, as embodied and broadly described herein, a method of adding filters to a proxy server comprises the steps of creating the proxy server operative to receive filters, creating a filter having a filter rule and a filter servlet, adding the filter to the proxy server, wherein the proxy server is operative to modify information using the added filter. Multiple filters may be added to the proxy server.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE PREFERRED EMBODIMENT

Reference will now be made in detail to an implementation consistent with the present invention as illustrated in the accompanying drawings. Wherever possible, the same reference numbers will be used throughout the drawings and the following description to refer to the same or like parts.

Introduction

Systems and methods consistent with the present invention use plug-in filters for forward and reverse filtering of information transmitted between a client process and a server process. A proxy server interfaces with the server process and the client process and monitors the requests and responses that are transmitted between them. The system and method described herein allow users to create filters and define them into the proxy server thereby allowing the user to tailor what and how information gets filtered. These plug-in filters modify the information between the client process and the server process in some manner. The modification may be content based, such as to remove security information, or other modification, such as changing the information transmitted from the server process so that it is operable and compatible in the client process, e.g., changing display resolution characteristics.

In more detail, a proxy server is interfaced with the client and server processes. A filter is created and plugged into the proxy server. A filter comprises a filter rule and a filter servlet. The filter rule defines what is to be filtered. For example, a Uniform Resource Locator (URL) for requests can be defined as a filter rule, and consequently, any information requested by the client process to the defined URL will have a filter applied to it. The filter servlet is the actual instructions, that when executed, modify the information contained in the request or response. Therefore, using the previous example, once the request has been flagged as requiring filtering, by matching the defined URL, the filter servlet associated with the filter rule will be executed to modify the information in the request in some manner.

Methods and systems consistent with the present invention also supports the addition of multiple plug-in filters. By adding filters, the user can make multiple changes to what and how information is filtered. Furthermore, such methods and systems can also be configured to handle administrative tasks associated with the transmission of requests and responses between client and server processes. Caching also may be performed to speed access for multiple requests for the same information. When caching is implemented, it is preferable that the filtered response be cached in order that the filter does not need to be applied again to the response received from the server process.

Figure 1:
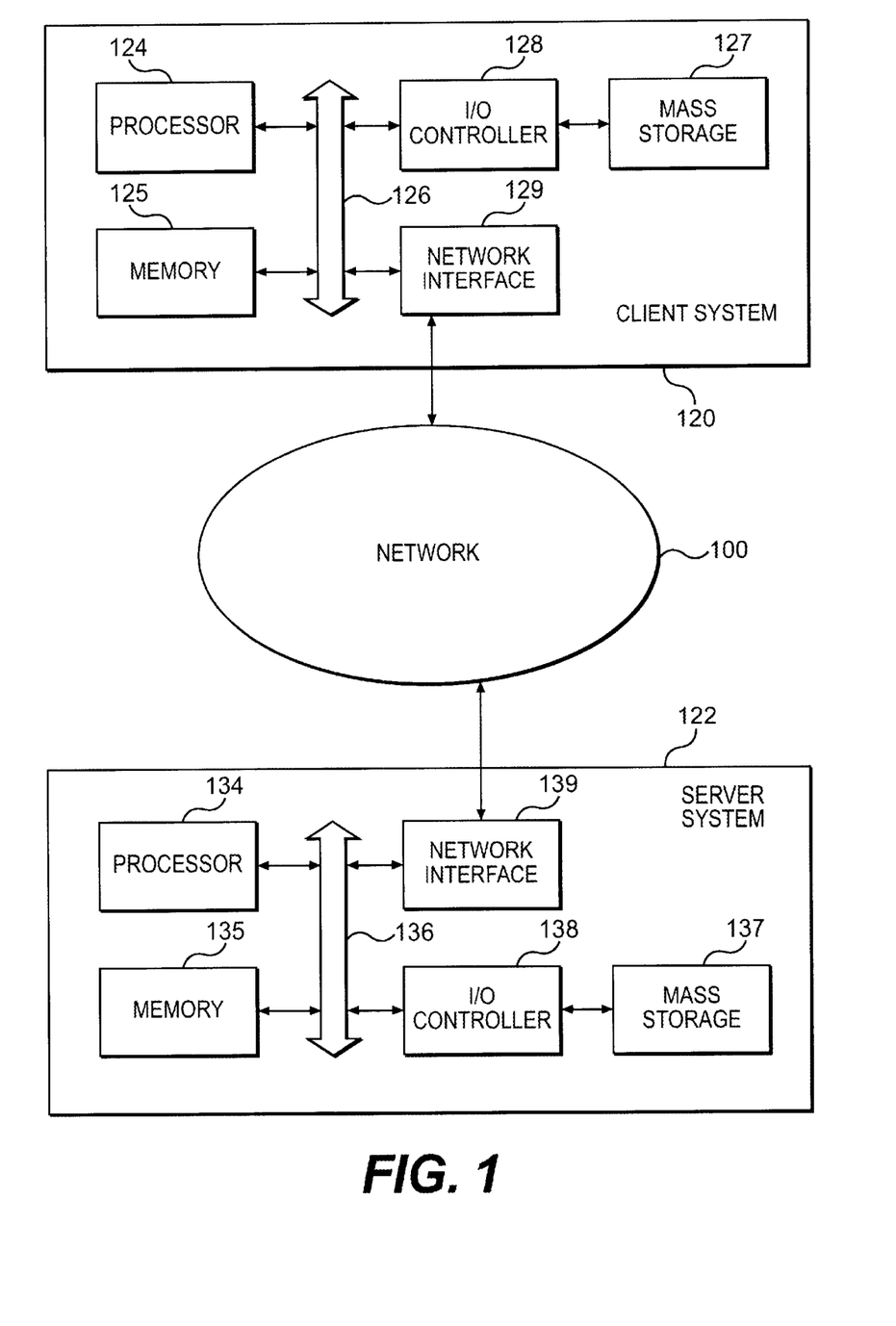
FIG. 1 shows a computer network containing a client and a server system.

FIG. 1 shows, in more detail, an example of a client-server system interconnected through a network 100. In this example, a remote server system 122 is interconnected through network 100 to client system 120. Client system 120 includes conventional components such as a processor 124, memory 125 (e.g. RAM), a bus 126 which couples processor 124 and memory 125, a mass storage device 127 (e.g. a magnetic hard disk or an optical storage disk) coupled to processor 124 and memory 125 through an I/O controller 128 and a network interface 129, such as a conventional modem.

Server system 122 also includes conventional components such as a processor 134, memory 135 (e.g. RAM), a bus 136 which couples processor 134 and memory 135, a mass storage device 137 (e.g. a magnetic or optical disk) coupled to processor 134 and memory 135 through an I/O controller 138 and a network interface 139, such as a conventional modem. It will be appreciated from the description below that the present invention may be implemented in software which is stored as executable instructions on a computer readable medium on the client and server systems, such as mass storage devices 127 and 137 respectively, or in memories 125 and 135 respectively.

While the network described with respect to FIG. 1 reference a network, it will be recognized by one skilled in the art that the network may be any topology, including the Internet, private networks and internal computer structures, that allows either various computer systems or modules within a single computer system to exchange information.

Figure 2:
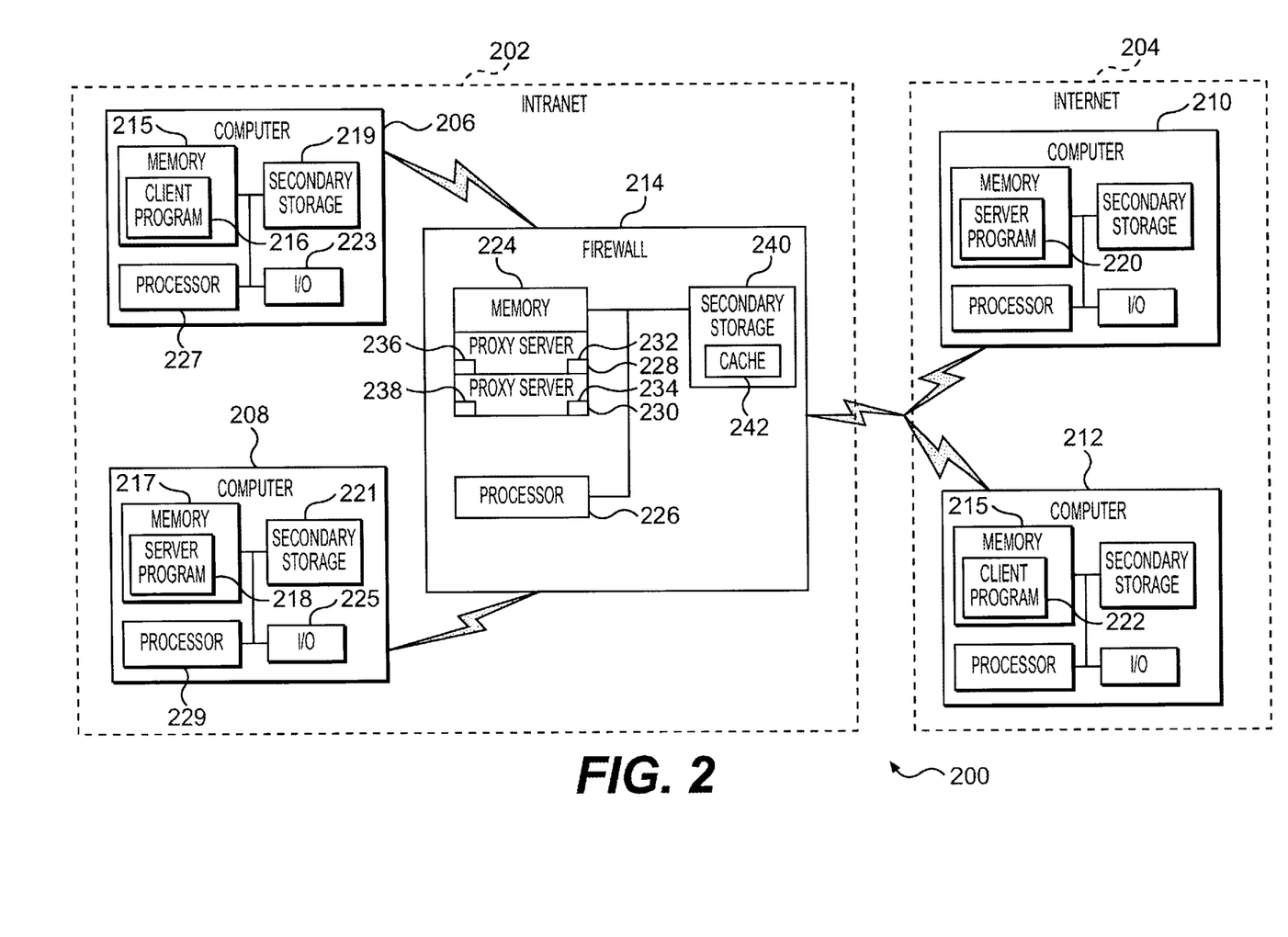
FIG. 2 depicts a data process system suitable for practicing methods and systems consistent with the present invention.

FIG. 2 depicts a data processing system suitable for practicing methods and systems consistent with the present invention. Data processing system 200 comprises Intranet 202 and Internet 204. Intranet 202 reflects the network of an organization, and it contains computer 206, computer 208, and firewall 214. Firewall 214 monitors both inbound traffic to Intranet 202 and outbound traffic to Internet 204. Computer 206 and computer 208 each have a number of components, including memory 215, 217, secondary storage devices 219, 221; at least one I/O device 223, 225; and processors 227, 229. Internet 204 contains computers 210, 212 having similar components to computers 206 and 208. Although Intranet 202 and Internet 204 are depicted as only having two computers, one skilled in the art will appreciate that these networks may have many more computers. Furthermore, one skilled in the art will recognize that methods and systems consistent with the present invention may be used in conjunction with other local-area or wide-area networks. Additionally, computers 206, 208, 210, and 212 may contain additional or different components.

Firewall 214 contains a memory 224, a processor 226, and a secondary storage device 240. Memory 224 contains proxy server 228 and proxy server 230 in accordance with methods and systems consistent with the present invention. Proxy servers 228 and 230 each contain a filter 232, 234. By using filter 232, proxy server 228 performs forward filtering. "Forward filtering" refers to the proxy server filtering requests originating from within Intranet 202 that are destined for Internet 204 as well as responses to these requests. For example, client program 216 on computer 206 may attempt to access a server program 220 on computer 210. In this situation, filter 232 indicates the outbound requests and the inbound responses that are allowed to flow through the firewall as well as any portions of the requests or responses that should be blocked. That is, the filtering performed by methods and systems consistent with the present invention includes blocking portions of a web site from being accessed or blocking the entire web site from being accessed.

By using filter 234, proxy server 230 can perform reverse filtering. "Reverse filtering" refers to the proxy server filtering requests originating from Internet 204 that are destined for Intranet 202 as well as the responses to these requests. For example, a client program 222 on computer 212 may attempt to access a server program 218 on computer 208. In this situation, proxy server 230 utilizes filter 234 to determine which requests and responses are allowed to pass through in their entirety and which may be allowed but only after modification.

In addition to filters 232, 234, the proxy servers may contain a servlet 236, 238, which is code that allows the proxy server to communicate utilizing any of a number of well-known protocols, such as the hypertext transfer protocol (HTTP). It should be appreciated that in accordance with methods and systems consistent with the present invention, a single proxy server may be configured to perform both forward filtering and reverse filtering. Also, the proxy server may be located on other devices besides firewall 214, such as a computer. Although aspects of the present invention are described as being stored in memory, those skilled in the art will appreciate that these aspects may also be stored on or read from other computer-readable media, such as hard disks, floppy disks, CD-ROM, a carrier wave from a network like the Internet, or other forms of RAM or ROM.

Another aspect of the proxy server consistent with methods and systems consistent with the present invention is that it caches data into a cache 242 of the firewall 214 after it is retrieved from a remote location via a request. Thus, all subsequent requests for the data are satisfied by using the locally stored copy of the data instead of incurring communication overhead. The version of the data cached is the filtered version. Therefore, if the filter (e.g. filter 234) removed content from the data, it is this modified version that gets cached. The data is cached in a protocol-independent manner. That is, regardless of the protocol used (e.g., HTTP or FTP) to access the data, the data is stored in cache 242. Accordingly, cache 242 may contain data accessed by using different protocols. Although methods and systems consistent with the present invention have been described as caching data on a secondary storage device, an alternative embodiment caches the data in memory 224.

Figure 3:
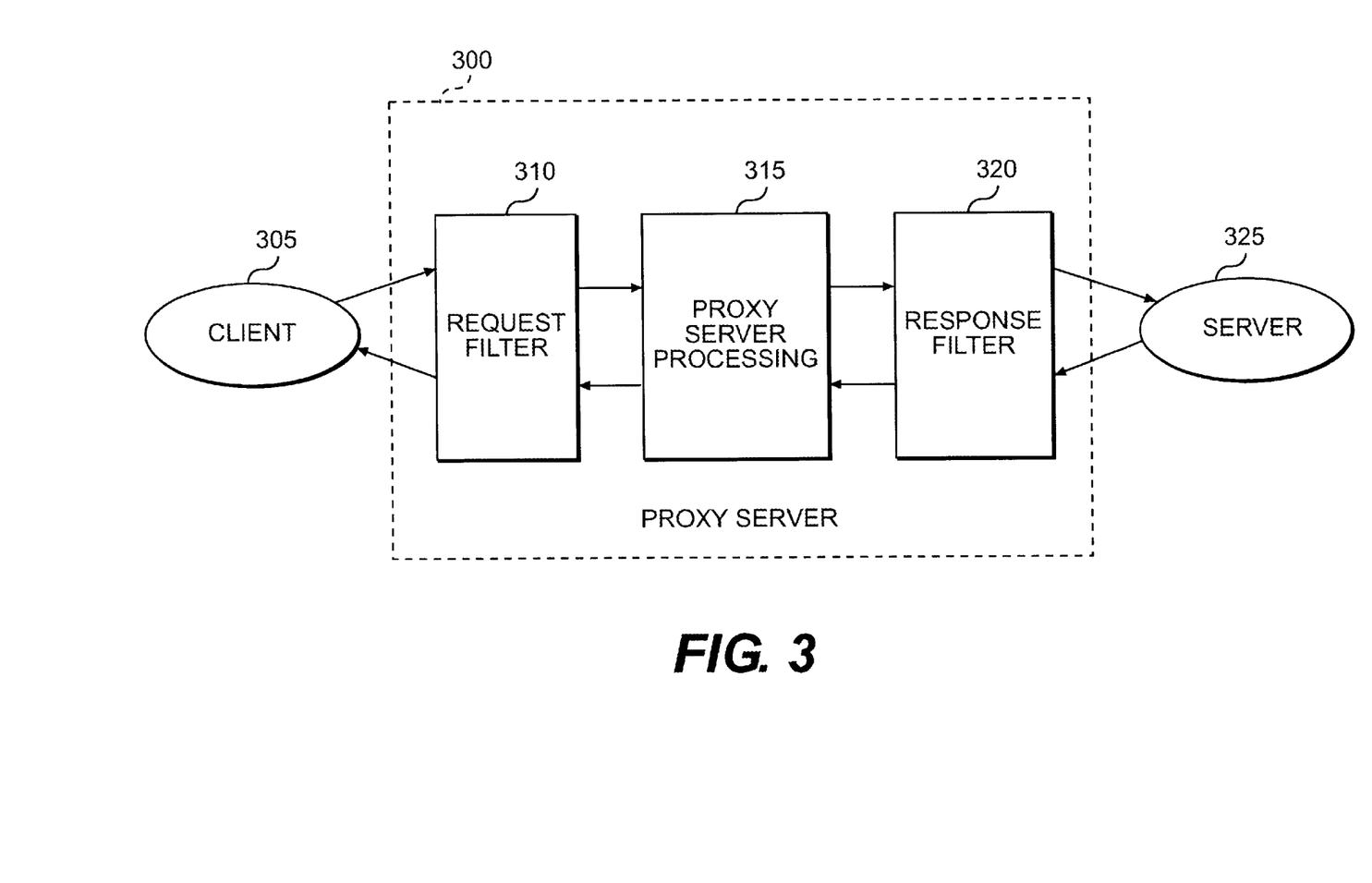
FIG. 3 depicts the components of a proxy server architecture used to filter information in a manner consistent with an exemplary embodiment of present invention.

FIG. 3 is a pictorial diagram of the proxy server architecture used to filter information in a manner consistent with the exemplary embodiment of the present invention. In one embodiment of the present invention, the components of the proxy server 300 include a request filter 310 containing filter rules, a response filter 320 also containing filter rules and a proxy server processing component 315. The proxy server interfaces with a client process 305, which desires information from the server process 325. The client can be any computer connected to the network or directly connected to the server 325. Typically, the client generates requests to send to the server and receives responses back from the server that satisfy the request.

The proxy server 300 is logically between the client process 305 and the server process 325 and may be contained within a business's firewall. Within the proxy server, the request filter 310 receives requests sent by the client requesting information from the server. The request filter 310 analyzes the request and determines if any of the information in the request is subject to a filter defined in the proxy server processing area 315. This analysis is performed by the use of filter rules. Filter rules define what should be filtered. In one embodiment, filter rules include Uniform Resource Locators (URLs). Therefore when a request is received, the URL is checked against the filter rules to determine whether this request is one that should be filtered. Checking for URLs can be done in any manner recognized by those skilled in the art, such as including the filter rules in a table, database or creating a regular expression and comparing the URLs against the created regular expression.

In the event that the request needs to be filtered, i.e., it satisfies one of the filter rules, the request is passed on to the proxy server processing 315 to modify any information in the request as defined by a filter servlet. A filter servlet contains the instructions, that when executed, perform the modification to the request. It is the servlet, for example, that instructs the proxy server to remove any security information from the request prior to sending the request to the server process.

The server generates a response to the request to be sent back to the client 305. In one embodiment of the present invention, the response is not sent directly to the client but, however, is sent to the proxy server 300 and received by the response filter 320. Similarly, as with the request filter rule, the response filter rule checks the response to determine whether the response should be filtered prior to sending it to the client process. The response may be filtered to remove objectionable information from being passed to the client or may be modified so that the information will work in the client process's environment, such as modifying the display resolution characteristics defined by a server process but incompatible to the client process.

In the event that the response satisfies one of the response filter rules, the proxy server applies one of the filter servlets associated with the satisfied filter rule to the response. It should be recognized by those skilled in the art that the proxy server need not perform both request and response filtering simultaneously. The proxy server may only process requests or only responses. The determination of what and how to filter is defined by the user.

The proxy server processing component 315 will modify information as dictated by any of the filters defined to the proxy server 300. These filters, i.e., filter rules and servlets, are modular and can be plugged into the proxy server by defining a response or request filter rule and defining it to the appropriate rule component. The filter servlet associated with the filter rule is then defined to proxy server processing component.

The proxy server processing may also perform other functions in addition to applying the filer servlet. These other functions include logging the responses and requests as well as caching the filtered responses that are received by the server process for quick retrieval. Caching provides a benefit in the case where another client requests the same information, the retrieval time is reduced because information can be retrieved from the cache instead of sending another request to the server process. In the instances where responses are cached, it is preferable cache the response after it has been filtered. Caching filtered responses prevents the proxy server from having to filter a response again, even though it is retrieved from the cache.

While FIG. 3 depicts one client process, one server process, and one proxy server, it should be recognized by one skilled in the art that there may be multiple client processes connected to a proxy server and that there may also be multiple proxy servers chained together to filter the requests and responses from the client and server processes. In addition, there may be multiple server processes that the client process is accessing through a network. While the network is not shown in FIG. 3, it should also be recognized by one skilled in the art that the focus of the present invention is that the proxy server processes information coming from the client to the server, and vice versa. A network may be located between the client process and proxy server, the proxy server and server process or anywhere in between the client and server processes.

Figure 4:
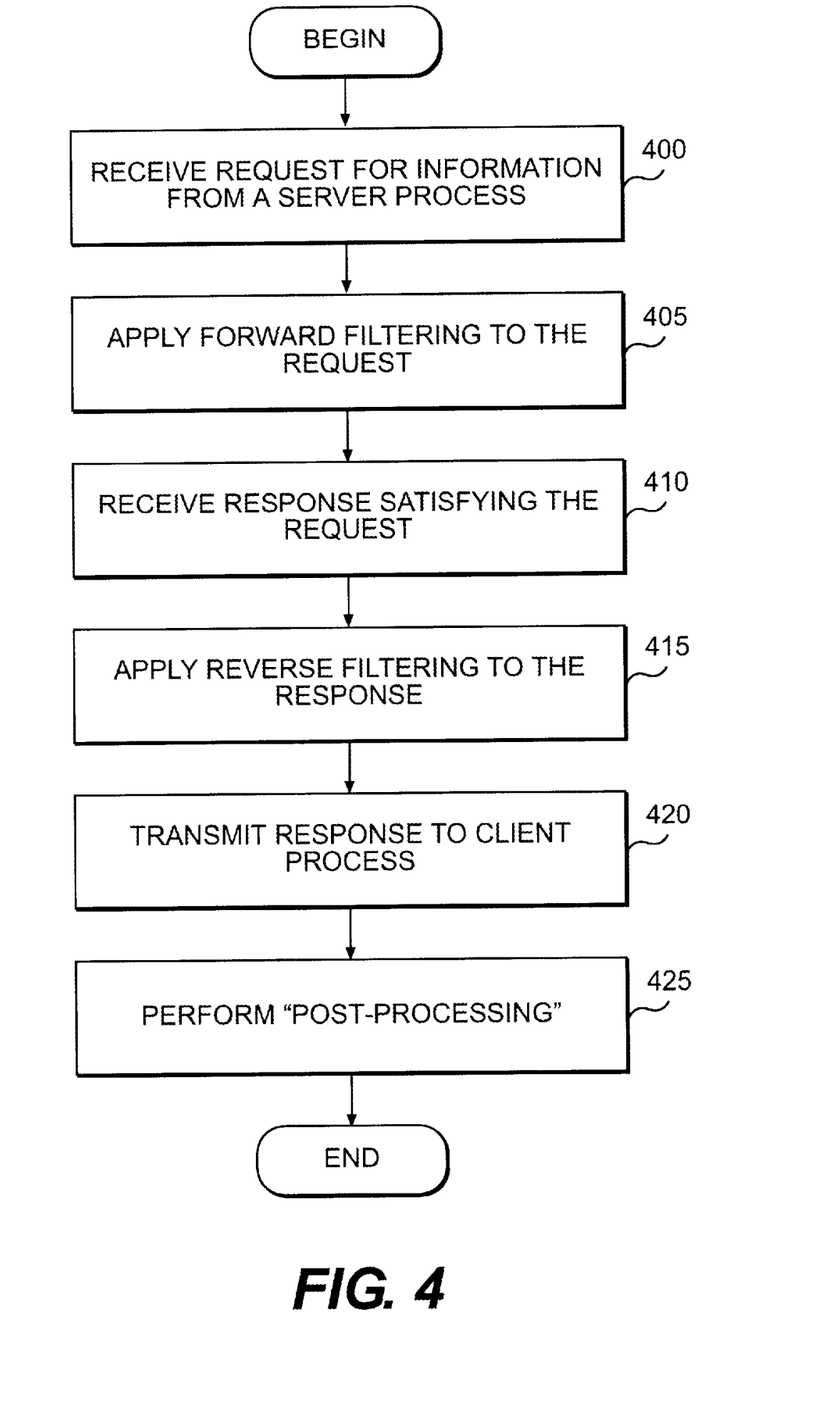
FIG. 4 depicts a flow chart of the high level steps involved with practicing forward and reverse filtering in a manner consistent with an exemplary embodiment of the present invention.

FIG. 4 is a flow chart of the high level steps involved with forward and reverse filtering. Forward filtering, as stated above, is defined as filtering performed on an outbound request from a client process. Conversely, reverse filtering is defined as filtering performed on inbound responses from the server process destined for the client process. The process begins by receiving a request by the client for information from the server processor (Step 400). In one embodiment of the present invention, the server process is a web server and the client process is a computer connected to the Internet trying to access information using a web browser.

Following retrieval of the request, systems and methods consistent with the present invention then apply a forward filter to the request (Step 405). The forward filter, for example, may remove any security information that a business does not want sent outside of the business domain. In response to receiving the request, the server process generates a response to the request to be sent back to the client process. A response, for example, may include a document requested by the client process from a Web server. The proxy server then receives this response satisfying this request (Step 410).

In one embodiment, the response was previously received from the server and placed in a cache accessible by the proxy server. When the response has been placed in the cache, it is directly sent to the client process without initiating another request to the server process, thereby speeding up retrieving time. It is preferable that timestamping be used to prevent the sending of old cached responses to the client. Timestamping is recognized by those skilled in the art as the process of removing old data that has expired, yet still remains in the cache. In addition, it is preferable to filter responses prior to caching them, thereby allowing the proxy server to send the filtered response directly to the client process without having to go through the filtering process again.

In the event the response is not in cache, then after receiving the response from the server process, systems and methods consistent with the present invention then apply the reverse filtering to the response (Step 415). Similar to forward filtering, reverse filtering can modify the information that is contained in the response. Parameter modification to make the information operative in the client process's environment or removal of objectionable information are examples of reverse filtering.

Following the application of the reverse filter, the filtered response is then sent to the client for its usage (Step 420). This filtered response satisfies the requirements of the domain containing the proxy server by filtering out and/or modifying information the domain, as defined in the filters. After sending the response to the client process, the proxy server may perform "post-processing" on the filtered response (Step 425). It is here, for example, where the proxy server may cache the filtered response. In addition, other administrative functions may be performed such as the logging of the requests and responses that have passed through the proxy server.

Figure 5:
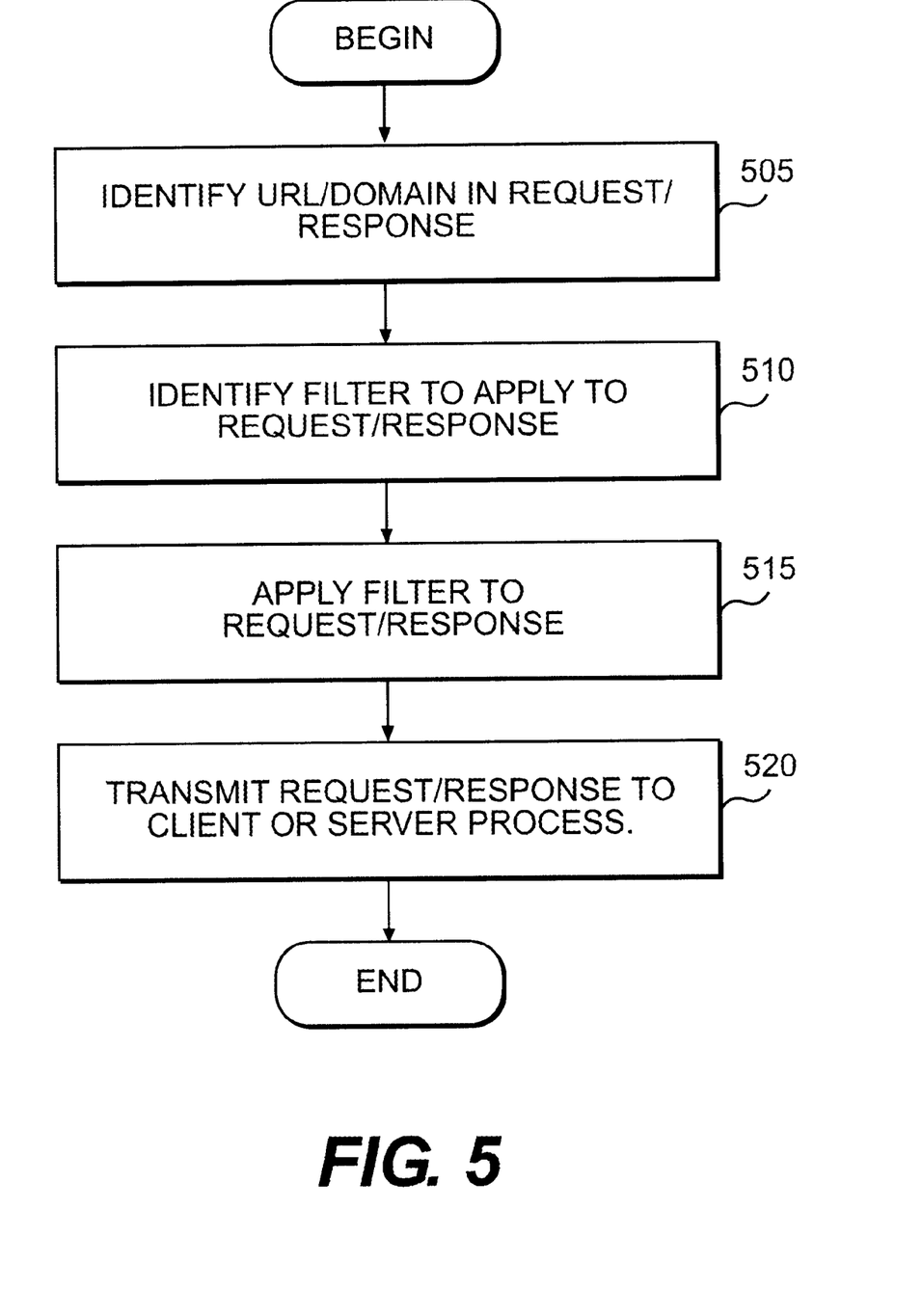
FIG. 5 depicts a flow chart depicting the steps to filter a request or a response in a manner consistent with an exemplary embodiment of the present invention.

FIG. 5 is a flow chart depicting the steps to filter a request or response in a manner consistent with the exemplary embodiment of the present invention. FIG. 5 depicts the detailed steps that were described generally in FIG. 4, Steps 405 and 415. Following the reception of a request or response, systems and methods consistent with the present invention identify the URL, or domain, in the request or response (Step 505). In one embodiment of the present invention, the client is submitting a request to a web server and, in answering that request, the web server will transmit a response. Both the request and the response will indicate a URL for the client and server processes. The systems and methods consistent with the present invention utilize this information to determine whether this request or response should be filtered. Therefore, following the identification of the URL in the response or request, the system and methods consistent with the present invention then proceed to determine if a filter exists for the identified URL (Step 510).

When a filter is created and added to a proxy server (described in more detail with respect to FIG. 6), the proxy server is given a filter rule that identifies a URL to be filtered and to apply the filter to a request or response. This listing of URL's can be maintained in a table, database or any other data structure that can be used to perform a lookup function. When the systems and methods consistent with the present invention receive a request or a response, the server process URL information is retrieved. Using this URL information, the systems and methods consistent with the present invention then compare this against all the filter rules that have been defined to the proxy server.

After comparing the URL information against the filter rules, and determining that a filter is defined for the response or request, systems and methods consistent with the present invention then proceed to apply a filter to the response or request as defined by instructions in the filter servlet associated with the filter rule (Step 515). These instructions, when executed, will modify the request or response in some manner as dictated by the filter servlet. After the filter is applied to the request or response, the filtered information is then passed along to either the client in the case of a response, or the server in the case of a request (Step 520).

Figure 6:
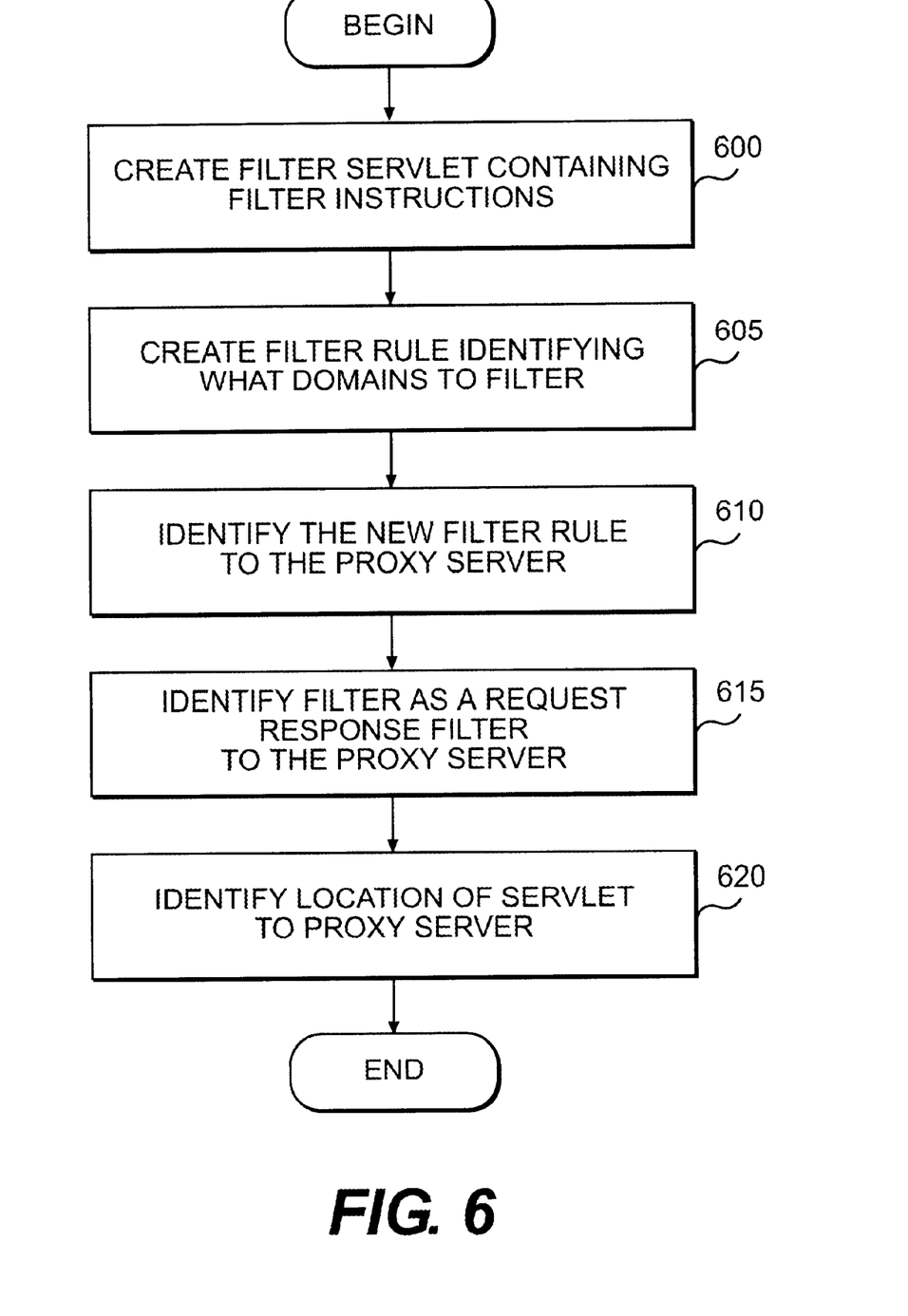
FIG. 6 depicts a flow chart depicting the steps required to add a filter to a proxy server in a manner consistent with an exemplary embodiment of the present invention.

FIG. 6 is a flow chart depicting the steps required to add a filter to a proxy server in a manner consistent with an exemplary embodiment of the present invention. One of the advantages of the present invention is the ability to "plug in" various filters into the proxy server without having to develop all new software for the proxy server. This allows local system administrators to tailor a proxy server that will filter desired information specific to a domain. Systems and methods consistent with the present invention add a filter to the proxy server by creating a filter servlet (Step 600). The servlet is a set of instructions, associated with the filter rule, that when executed performs the modification on the request or response to satisfy the system administrator's requirements.

A filter rule is then created (Step 605), which will trigger the execution of a filter servlet. The filter rule is an identification of the domains, e.g., URL's, that the instructions created in the filter servlet in Step 600 are to be applied to. For example, the user may indicate a number of web addresses, or URL's, that are of particular concern from a security stand point and may define these URL's, as filter rules, to the proxy server. When a request or a response containing URL's is received by the proxy server, a test is executed to determine if the received URL matches one of the predefined filter rules. If a match is established, then the filter servlet that is associated with the matched filter rule is executed and applied to the request or response.

After creation of the filter servlet and the filter rule, systems and methods consistent with the present invention then identify the new filter rule to the proxy server (Step 610). While the system administrator has created the filter rule and servlet to protect or modify the information that enters into its domain, these filters need to be defined to the proxy server in order to be operable. When identifying the filter to the proxy server, it is preferable that the filter rules are placed in a list with other filter rules, such that the proxy server can compare a retrieved URL with all the filter rules to be filtered.

Next the filter rule is identified to the proxy server as applying to either a request or response (Step 615). This will prevent the proxy server from inadvertently applying a filter to a response when it should be applied to a request or vice versa.

Finally, the location of the filter servlet is identified to the proxy server (Step 620). This may be performed by placing the filter servlet at the same location as all the other filter servlets. Placing all the filter servlets at the same location prevents the proxy server from having to search for the desired filter servlet. However, there are many software designs that provide for identifying one piece of code to another, such as maintaining a database wherein a pointer is used for location information. Providing the proxy server with the location of the filter servlet is an implementation choice and the various implementation schemes to provide this function are considered within the scope of the present invention.

Conclusion

Systems and methods to filter information between a client and a server process in a manner consistent with the present invention thus facilitates the tailoring of filters to satisfy the needs of a specific domain. By allowing plug-in filters, users can, easily and dynamically, modify what requests and responses get filtered in addition to what type of information is filtered from the requests and responses. Furthermore, by caching the filtered responses, significant increases in processing time is achieved for those client processes requesting the same information.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but systems and methods consistent with the present invention may be implemented as a combination of hardware and software or in hardware alone. The invention may be implemented with both object-oriented and non-object-oriented programming systems. Additionally, although aspects of the present invention are described for being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method of filtering information between a first process executing on a first processor and a second process executing on a second processor using a proxy separate from the first and second processors, comprising the steps of:

receiving, at the proxy, a plurality of sets of instructions configured by the first process that are identified based on respective rules for providing information between the first and second processes;

receiving, at the proxy, information from the first process that is destined to the second process;

determining whether the information destined to the second process satisfies at least one of the rules;

selecting sets of instructions identified by the rules that were satisfied;

filtering, at the proxy, the information destined to the second process based on the selected sets of instructions;

modifying the information destined to the second process based on the selected sets of instructions; and transmitting the modified information to the second process.

2. The method of claim 1, wherein receiving the information from the first process that is destined to the second process comprises a request for additional information from the second process.

3. The method of claim 2, wherein modifying the information destined to the second process comprises removing information that indicates security data.

4. The method of claim 1, further comprising:

receiving a response from the second process based on the modified information;

modifying, at the proxy, the response based on the selected sets of instructions; and transmitting the modified response to the first processor.

5. The method of claim 4, further comprising:

caching the modified response at the proxy.

6. The method of claim 1, wherein determining whether the information destined to the second process satisfies at least one of the rules comprises:

identifying a first Uniform Resource Locator (URL) in the information;

retrieving a second URL based on the information; and comparing the first URL and the second URL.

7. The method of claim 1, wherein receiving, at the proxy, the plurality of sets of instructions comprises receiving at least one plug-in.

8. The method of claim 7, wherein filtering, at the proxy, the information based on the selected sets of instructions comprises executing the plug-in at the proxy.

9. A method of filtering information between a client and a server using a proxy server separate from the client and the server, comprising:

receiving requests from a client process executing on the client;

determining, at the proxy server, when the requests satisfy at least one of a first plurality of rules that each identify a set of instructions configured by the client;

selecting sets of instructions that are identified by the satisfied rules of the first plurality of rules;

filtering, at the proxy server, the requests based on the selected sets of instructions;

transmitting the requests that passed the filtering at the proxy server to a server process executing on the server;

receiving responses from the server based on the transmitted requests;

determining when the responses satisfy at least one of a second plurality of rules that each identify an additional set of instructions;

selecting additional sets of instructions that are identified by the satisfied rules of the second plurality of rules; and filtering, at the proxy server, the responses based on the selected additional sets of instructions that correspond to the satisfied rules of the second plurality of rules.

10. The method of claim 9, wherein filtering, at the proxy server, the requests comprises:

identifying a Uniform Resource Locator (URL) in at least one of the requests; and filtering the at least one request based on the identified URL.

11. The method of claim 9, wherein filtering, at the proxy server, the response comprises:

identifying a Uniform Resource Locator (URL) in at least one of the responses; and filtering the at least one response based on the identified URL.

12. The method of claim 11, further comprising;

caching, at the proxy server, the at least one response.

13. The method of claim 9, further comprising;

receiving, at the proxy server, at least one additional set of instructions configured by the client.

14. The method of claim 13, wherein receiving the at least one additional set of instructions comprises receiving a plug-in configured by the client.

15. An apparatus for filtering information between a first processor and a second processor, wherein the apparatus is separate from the first and second processors, comprising:

means for receiving a plurality of sets of instructions configured by the first processor that are identified based on respective rules for transmitting information from the first processor to the second processor;

means for receiving information from the first processor that is destined to the second processor;

means for determining whether the information destined to the second processor satisfies at least one of the rules;

means for selecting sets of instructions identified by the rules that were satisfied;

means for filtering the information destined to the second processor based on the selected sets of instructions;

means for modifying the information destined to the second processor based on the selected sets of instructions; and means for transmitting the modified information to the second processor.

16. An apparatus for filtering information between a client and a server, wherein the apparatus is separate from the client and the server, comprising:

means for receiving requests from a client process executing on the client;

means for determining when the requests satisfy at least one of a first plurality of rules that each identify a set of instructions configured by the client;

means for selecting sets of instructions configured by the client that are identified by the satisfied rules of the first plurality of rules;

means for filtering the requests based on the selected sets of instructions;

means for transmitting the requests passed by the means for filtering to a server process executing on the server;

means for receiving responses from the server based on the transmitted requests;

means for determining when the responses satisfy at least one of a second plurality of rules that each identify an additional set of instructions;

means for selecting additional sets of instructions that are identified by the satisfied rules of the second plurality of rules; and means for filtering the responses based on the selected additional sets of instructions that correspond to the satisfied rules of the second plurality of rules.

17. A proxy for filtering information between a first processor and a second processor and separate from the first and second processors, comprising:

a first filter, coupled to the first processor, for receiving information from the first processor and a plurality of sets of instructions that are identified based on respective rules;

a third processor, coupled to the first filter, for determining whether the information satisfies at least one of the rules, selecting at least one of the sets of instructions identified by the rules that were satisfied, determining whether the received information is destined to the second processor, and modifying the received information based on the at least one selected set of instructions; and a second filter, coupled to the second processor and third processor, for receiving the modified information from the third processor and filtering the modified information based on a second set of rules.

18. The proxy of claim 17, wherein the second filter is configured to transmit the modified information based on the second set of rules and receive at least one response from the second processor based on the modified information.

19. The proxy of claim 18, further comprising:

a memory for storing the at least one response from the second processor; and wherein the first filter is configured to provide the stored at least one response to at least one additional processor based on receiving a request from the at least one additional processor that is destined to the second processor.

20. The proxy of claim 18, wherein the third processor modifies the received information based on at least one plug-in configured by the first processor.

21. A computer-readable medium comprising computer-executable instructions executed by a proxy separate from a first processor and a second processor for filtering information between the first processor and the second processor, the computer-readable medium comprising:

program code for receiving a plurality of sets of instructions configured by the first processor that are identified based on respective rules for providing information between the first and second processors;

program code for receiving information from the first processor that is destined to the second processor;

program code for determining whether the information destined to the second processor satisfies at least one of the rules;

program code for selecting sets of instructions identified by the rules that were satisfied;

program code for filtering the information destined to the second processor based on the selected sets of instructions;

program code for modifying the information destined to the second processor based on the selected sets of instructions; and program code for transmitting the modified information to the second processor.

22. A computer-readable medium comprising computer-executable instructions executed by a proxy server separate from a client and a server for filtering information between the client and the server, the computer-readable medium comprising:

program code for receiving requests from a client process executing on the client;

program code for determining when the requests satisfy at least one of a first plurality of rules that each identify a set of instructions;

program code for filtering the requests based on the sets of instructions that correspond to satisfied rules of the first plurality of rules;

program code for transmitting the filtered requests to a server process executing on the server;

program code for receiving responses from the server based on the transmitted requests;

program code for determining when the responses satisfy at least one of a second plurality of rules that each identify an additional set of instructions;

program code for selecting additional sets of instructions that are identified by the satisfied rules of the second plurality of rules; and program code for filtering the responses based on the selected additional sets of instructions that correspond to the satisfied rules of the second plurality of rules.

23. A method of filtering information between a first processor and a second processor using a proxy separate from the first and second processors, comprising the steps of:

receiving, at the proxy, a plurality of sets of instructions configured by the first processor that are identified based on respective rules for providing information between the first and second processors;

receiving, at the proxy, information from the first processor that is destined to the second processor;

determining whether the information destined to the second processor satisfies at least one of the rules;

selecting sets of instructions identified by the rules that were satisfied;

filtering, at the proxy, the information destined to the second processor based on the selected sets of instructions;

modifying the information destined to the second processor based on the selected sets of instructions; and transmitting the modified information to the second processor.

24. A system for filtering information between a first processor and a second processor using a proxy separate from the first and second processors, comprising the steps of:

means for receiving, at the proxy, a plurality of sets instructions configured by the first processor that are identified based on respective rules for providing information between the first and second processors;

means for receiving, at the proxy, information from the first processor that is destined to the second processor;

means for determining whether the information destined to the second processor satisfies at least one of the rules;

means for selecting sets of instructions identified by the rules that were satisfied;

means for filtering the information destined to the second processor based on the selected sets instructions;

means for modifying the information destined to the second processor based on the selected sets of instructions; and means for transmitting the modified information to the second processor.

25. A computer-readable medium comprising computer-executable instructions executed by a proxy server separate from a first processor and a second processor for filtering information between the first and second processors, the computer-readable medium comprising:

program code for receiving, at the proxy, a plurality of sets of instructions configured by the first processor that are identified based on respective rules for providing information between the first and second processors;

program code for receiving, at the proxy, information from the first processor that is destined to the second processor;

program code for determining whether the information destined to the second processor satisfies at least one of the rules;

program code for selecting sets of instructions identified by the rules that were satisfied;

program code for filtering the information destined to the second processor based on the selected sets of instructions;

program code for modifying the information destined to the second processor based on the selected sets of instructions; and program code for transmitting the modified information to the second processor.

* * * * *

UNITED STATES PATENT AND TRADEMARK OFFICE
CERTIFICATE OF CORRECTION

PATENT NO. : 6,604,143 B1 Page 1 of 1
DATED : August 5, 2003
INVENTOR(S) : Vivek Naguar et al.

It is certified that error appears in the above-identified patent and that said Letters Patent is hereby corrected as shown below:

<u>Column 14,</u>
Line 18, "sets instructions;" should read -- sets of instructions; --.

Signed and Sealed this

Fourth Day of November, 2003

JAMES E. ROGAN
*Director of the United States Patent and Trademark Office*